United States Patent [19]

Liebig et al.

[11] 4,167,543

[45] Sep. 11, 1979

[54] THERMOPLASTIC MOLDING COMPOSITIONS

[75] Inventors: Lothar Liebig; Frank Wingler; Karl-Heinz Ott, all of Leverkusen; Gert Humme, Odenthal; Alfred Pischtschan, Kuerten, all of Fed. Rep. of Germany

[73] Assignee: Bayer Aktiengesellschaft, Fed. Rep. of Germany

[21] Appl. No.: 953,008

[22] Filed: Oct. 20, 1978

[30] Foreign Application Priority Data

Oct. 26, 1977 [DE] Fed. Rep. of Germany ....... 2747822

[51] Int. Cl.² ............................................. C08L 51/04
[52] U.S. Cl. .............................. 525/74; 260/29.7 W; 260/29.7 UP; 260/29.7 T
[58] Field of Search ............... 260/876 R, 880 R, 881, 260/887, 893, 898, 29.7 W, 29.7 UP, 29.7 T

[56] References Cited

U.S. PATENT DOCUMENTS

| | | | |
|---|---|---|---|
| 3,267,178 | 8/1966 | Lee | 260/880 R |
| 3,278,642 | 10/1966 | Lee | 260/880 R |
| 4,104,328 | 8/1978 | Swoboda et al. | 260/876 R |
| 4,107,234 | 8/1978 | Cornell | 260/876 R |
| 4,113,798 | 9/1978 | Moran | 260/876 R |

FOREIGN PATENT DOCUMENTS

| | | |
|---|---|---|
| 1245131 | 7/1967 | Fed. Rep. of Germany . |
| 1949487 | 4/1971 | Fed. Rep. of Germany . |
| 1315219 | 5/1973 | United Kingdom . |

*Primary Examiner*—Thomas DeBenedictis
*Attorney, Agent, or Firm*—Connolly and Hutz

[57] ABSTRACT

A thermoplastic moulding composition comprising a polymer mixture of (A) 25 to 95% by weight of a graft polymer of 70 to 30% by weight of a mixture of styrene (95 to 50% by weight) and acrylonitrile (5 to 50% by weight) on 30 to 70% by weight of polybutadiene or a butadiene-styrene copolymer, and (B) 5 to 75% by weight of a terpolymer containing 10 to 30 parts by weight of acrylonitrile, 7.5 to 15 parts by weight of maleic acid anhydride, and 82.5 to 55 parts by weight of styrene in copolymerized form.

1 Claim, No Drawings

THERMOPLASTIC MOLDING COMPOSITIONS

Impact-resistant thermoplastic moulding compositions can be produced for example by polymerising styrene (S) and acrylonitrile (A) in the presence of polybutadiene (B) ("ABS-polymers"). By using an amorphous polyolefin instead of polybutadiene, a considerable improvement in weather resistance is obtained, providing the polyolefin does not contain any C=C-bonds in the main chain. For example EPDM rubbers of ethylene (E), propylene (P) and an unconjugated diene (D) are used and "AES-polymers" are obtained, i.e., thermoplastic materials in which acrylonitrile (A) and styrene (S) are graft-polymerised onto an EPDM rubber (E).

In general, AES- and ABS-plastics consist of two phases. The continuous phase is a copolymer of the monomers grafted on, generally a styrene-acrylonitrile copolymer ("SAN-thermoplast"). The discontinuous phase incorporated is the actual graft polymer. By virtue of its grafted-on side chains ("SAN-jacket"), it is compatible with the copolymer.

Thus, German Offenlegungsschrift No. 1,949,487 describes mixtures of graft polymers of styrene and acrylonitrile on a rubber having a glass transition temperature below −30° C. with copolymers of styrene, maleic acid anhydride and, optionally, acrylonitrile, which may additionally contain a copolymer of styrene and acrylonitrile (SAN-resin).

The present invention provides thermoplastic moulding compositions of (A) 25 to 95% by weight of a graft polymer of
70 to 30% by weight of a mixture of styrene (95 to 50% by weight) and acrylonitrile (5 to 50% by weight) on
30 to 70% by weight of polybutadiene or a butadiene-styrene copolymer, and (B) 5 to 75% by weight of a terpolymer of acrylonitrile, maleic acid anhydride and styrene,
characterised in that the terpolymer contains 10 to 30 parts by weight of acrylonitrile, 7.5 to 15 parts by weight of maleic acid anhydride, and 82.5 to 55 parts by weight of styrene in co-polymerised form and is produced by continuous bulk polymerisation in an ideally mixed tank reactor under stationary conditions and with incomplete conversion of from 25 to 60 mole %, with volume time yields of from 200 to 2000 g/l and at temperatures of from 60° to 150° C. in the presence of from 0.01 to 0.5% by weight, based on monomers, of an initiator decomposing into radicals with a decomposition rate constant at 100° C. of greater than $5 \times 10^{-3}$ sec.$^{-1}$ and, in another continuous process step, is freed from the residual monomers to a content of less than 0.1% by weight, based on the terpolymer.

The graft polymers used in accordance with the invention are known. They may be obtained by polymerising styrene and acrylonitrile in the presence of the rubber. In that case, at least part of the styrene and acrylonitrile is graft-polymerised onto the rubber. In addition, ungrafted styrene-acrylonitrile copolymer is generally present. The graft copolymers may be obtained in known manner by subjecting styrene and acrylontrile to radical polymerisation in the presence of the rubber in bulk, emulsion, suspension or solution and also by combined processes such as bulk/suspension polymerisation or solution/precipitation polymerisation.

Polybutadiene and copolymers of butadiene and styrene containing up to 30% by weight of copolymerised styrene may be used as the rubber.

Graft polymers based on polybutadiene are obtained by polymerising the monomers, such as styrene and acrylonitrile, in the presence of a latex of the butadiene polymer. The polymer particles in the latex of the butadiene polymer generally have a size in the range of from 0.2 to 5μ. It is also possible by emulsion polymerisation to produce graft polymers in which the polymer particles have a size in the range of from 0.05 to 0.8μ. The production of the graft polymers used in accordance with the invention is not confined to the process of emulsion polymerisation. The graft polymers may also be obtained by dissolving the rubber in the monomers, for example in styrene and acrylonitrile, initiating the polymerisation reaction by heating and adding radical formers, producing a suspension by adding water after a certain monomer conversion has been reached and completing the reaction by bead polymerisation. A procedure such as this is described, for example, in German Auslegeschrift No. 1,245,131.

The terpolymer of styrene, acrylonitrile and maleic acid anhydride is produced by continuous bulk polymerisation under stationary conditions.

In the context of the invention, stationary conditions mean that the concentration of all the reactants and the composition of the products formed remain substantially constant throughout the polymerisation reaction. Stable stationary conditions are established in the tank reactor after about 0.5 to 24 hours, as measured from the beginning of the run. Where polymerisation is carried out continuously under stationary conditions, differential and integral compositions of the polymers are the same so that chemically uniform terpolymers are formed. In other words, the fractions of a terpolymer differ only negligibly from one another in their chemical composition.

Ideal admixture in the tank reactor is said to be obtained when the mixing-in time is less than one-tenth of the average residence time. The average residence time may be from 10 to 240 minutes and preferably from 20 to 120 minutes, whilst the mixing-in times are from 5 to 120 seconds and preferably from 5 to 30 seconds.

The initiators used for the continuous polymerisation reaction in the tank reactor have a decomposition rate constant (k) at 100° C. of greater than $5 \times 10^{-3}$ sec.$^{-1}$. The following are examples of the initiators used at polymerisation temperatures of from 60 to 150° C:

| | | |
|---|---|---|
| tert.-butyl peroctoate | k = $5.0 \times 10^{-3}$ sec.$^{-1}$ | at 100° C. |
| benzoyl peroxide | k = $5.2 \times 10^{-3}$ sec. | at 100° C. |
| lauryl peroxide | k = $2.2 \times 10^{-2}$ sec. | at 100° C. |
| tert.-butyl perpivalate | k = $3.2 \times 10^{-2}$ sec. | at 100° C. |
| isopropyl peroxydicarbonate | k = $1.4 \times 10^{-1}$ sec. | at 100° C. |
| 2-ethylhexyl peroxydicarbonate | k = $2.1 \times 10^{-1}$ sec. | at 100° C. |
| acetyl cyclohexyl sulphonyl peroxide | k = $10 \times 10^{-1}$ sec. | at 100° C. |

The initiators are used in quantities of from 0.01 to 0.5% by weight, based on the monomers.

Terpolymers whose acrylonitrile content is of the order of the acrylonitrile content of the graft polymers are particularly suitable for the moulding compositions according to the invention.

In order to reduce molecular weight, chain terminators or transfer agents, such as n- or tert.-dodecyl mercaptan, thioglycol, thioglycerol, cyclohexane or allyl alcohol, etc., may be used in quantities of from 0.1 to 2% by weight, based on the monomers.

The ratio between the monomers in the starting monomer mixture has to be selected in such a way that a polymer having the gross composition claimed in formed for the desired conversion. The composition of the starting monomers necessary for this purpose may be determined by tests in which it is varied until a terpolymer having the required gross composition within the claimed limits is formed. Thus, for a stationary conversion of 35%, the continuous polymerisation of a mixture of 74% by weight of styrene, 22% by weight of acrylonitrile and 4% by weight of maleic acid anhydride gives a terpolymer which provides the moulding compositions according to the invention with excellent thermal and mechanical properties. By contrast, the polymer formed from the same monomer mixture where copolymerisation is carried out in batches is unsuitable.

The polymer solution issuing from the tank reactor is freed from the solvent in another continuous process step. To this end, the polymer solution may either be concentrated by evaporation under reduced pressure or may be freed from the volatile constituents by blowing in an inert gas. Concentration by evaporation under reduced pressure is carried out by flash evaporation, screw evaporation, thin-layer evaporation, falling-film evaporation or spray drying, etc. Processes such as these are described by R. Erdmenger in "Maschinenmarkt", Vol. 80 (1974), No. 1, page 2, and No. 10, page 148.

By comparison with moulding compositions of the same graft polymers and SAN-copolymers, the moulding compositions according to the invention show good flow properties and an equally good toughness level coupled with a thermal stability under load increased by at least 12° C.

The moulding compositions according to the invention may be used with particular advantage for applications requiring high dimensional stability under heat, high toughness and easy processibility. Thus, they may be used with advantage for the production of pipelines, high quality seals, vessels, instruments sterilisable with superheated steam, washing machine components, battery cases, dry battery housings, housing and other insulating components in electrically operated machines, electrical insulating films, hydrolysis-stable vessel linings, chemically and thermally resistant filter cloths and many other things.

In the following Examples, the parts are parts by weight and the percentages are % by weight.

EXAMPLE (A) Graft polymer based on polybutadiene

The ABS-graft polymer is produced by polymerising 37 parts of styrene and 13 parts of acrylonitrile onto 50 parts of a polybutadiene (by emulsion polymerisation in accordance with German Auslegeschrifts Nos. 1,247,665 and 1,269,360), the average particle diameter of the polybutadiene graft base present in latex form being between 0.2 and 0.4μ, (B) Production of the terpolymer of styrene, acrylonitrile and maleic acid anhydride ("SAMA-copolymer")

2000 parts of a mixture of 7260 parts of styrene, 2200 parts of acrylonitrile, 440 parts of maleic acid anhydride and 25 parts of tert.-dodecylmercaptan are introduced into a jacketed reaction vessel provided with a blade stirrer, temperature sensor, inlet and outlet pipe. The contents of the reactor are then heated to 95° C and the polymerisation reaction is initiated at that temperature, the mixture being delivered to the reactor at a rate of 2000 parts per hour and the same quantity being run off from the reactor at the same time. The initiator is also continuously added to the reactor: 0.6 part per hour of tert.-butyl perpivalate (75% in dibutyl phthalate) so that a polymer solution having a solids content of approximately 30% is formed after about 2 hours. 0.1% by weight of 2,6-di-tert.-butyl-p-cresol is added to the solution of the polymer in the monomers removed from the reaction vessel, which is then freed from the monomers and the volatile constituents in an evaporation extruder.

The SAMA-copolymer contains 17% by weight of acrylonitrile, 12% by weight of maleic acid anhydride and 71% by weight of styrene.

The intrinsic viscosity $[\eta]$ amounts to 0.7 dl/g.

The distribution of monomers in fractions of different molecular weight is shown in the following Table:

| Fraction No. | % by weight | $[\eta]$ | % by weight AN | % by weight MSA | % by weight styrene |
|---|---|---|---|---|---|
| 1 | 4.21 | 1.28 | 18.0 | 12.3 | 69.7 |
| 2 | 7.25 | 1.09 | 18.6 | 12.7 | 68.7 |
| 3 | 19.16 | 0.96 | 17.2 | 12.9 | 69.9 |
| 4 | 9.73 | 0.86 | 18.6 | 11.9 | 69.5 |
| 5 | 11.14 | 0.77 | 18.4 | 12 | 69.6 |
| 6 | 11.52 | 0.64 | 18.0 | 11.5 | 70.5 |
| 7 | 11.91 | 0.52 | 16.5 | 12.0 | 71.5 |
| 8 | 26.75 | 0.50 | 13.5 | 12.1 | 74.4 |

(AN = acrylonitrile, MSA = maleic acid anhydride)

Fractionation was carried out from dimethyl formamide with cyclohexane at a temperature of 78° C.

Production of the mixture

The components are mixed in an internal kneader, spun off in the form of strands, granulated and injection-moulded to form test specimens. Table 1 shows the mixtures of graft polymer (A) with copolymers of different composition produced in the same way as (B) (tests 1 to 3). A standard commercial-grade SAN-copolymer of 75% by weight of styrene and 25% by weight of acrylonitrile having an intrinsic viscosity of 0.70 dl/g is used in comparison test 4.

TABLE 1

| Test No. | Mixing ratio Component (A) parts by weight | Mixing ratio Component (B) parts by weight | Component (B) | Composition S % by weight | Composition A % by weight | Composition MSA % by weight | $a_n$ 20° C. kg/m² | $a_n$ −40° C. kg/m² | $a_k$ 20° C. | $a_k$ 0° C. | $a_k$ −40° C. | Vicat ° C. | MFI 220° C./10 |
|---|---|---|---|---|---|---|---|---|---|---|---|---|---|
|   |   |   | a | 78 | 10 | 12 | 20 | — | 2 | — | — | 118 | 10.5 |
|   |   |   | b | 71 | 17 | 12 | 20 | 21 | 1.3 | 1.6 | 1.6 | 119 | 15.4 |
|   |   |   | c | 64 | 24 | 12 | 24 | — | 2 | — | — | 120 | 12 |
|   |   |   | d | 75 | 25 | — | — | — | — | — | — | 99 | 22 |
| 1 | 35 | 65 | a |   |   |   | 85 | 50 | 6.4 | 4.9 | 4.8 | 108 | 7.9 |
| 2 | 35 | 65 | b |   |   |   | $(57)_9$ | 71 | 10.5 | 9.8 | 7.4 | 110 | 6.5 |
| 3 | 35 | 65 | c |   |   |   | $(92)_3$ | $(86)_9$ | 14.5 | 12.6 | 8.5 | 110 | 6.8 |
| 4 | 35 | 65 | d |   |   |   | $(87)_1$ | $(95)_6$ | 14.8 | 11.4 | 7.7 | 95 | 9.0 |

Component (A) = graft polymer of styrene and acrylonitrile on polybutadiene according to A
Component (B) = copolymer of styrene, acrylonitrile and maleic acid anhydride according to B
S = styrene
A = acrylonitrile
MSA = maleic acid anhydride
$a_n$ = impact strength according to DIN 53 453. 10 standard small bars were tested in each case. Unless all the bars break under a given impact, the impact applied is put in brackets and the number of broken bars is indicated next to the figure in brackets.
ng = unbroken
$a_k$ = notched impact strength according to DIN 53 453
Vicat = dimensional stability under heat according to Vicat B in ° C.
MFI = melt flow index according to DIN 53 755.

We claim:
1. Thermoplastic moulding compositions of
(A) 25 to 95% by weight of a graft polymer of 70 to 30% by weight of a mixture of 95 to 50% by weight of styrene and 5 to 50% by weight of acrylonitrile on 30 to 70% by weight of polybutadiene or a butadiene-styrene copolymer, and
(B) 5 to 75% by weight of a terpolymer of acrylonitrile, maleic acid anhydride and styrene, characterised in that the terpolymer contains 10 to 30 parts by weight of acrylonitrile, 7.5 to 15 parts by weight of maleic acid anhydride, and 82.5 to 55 parts by weight of styrene, in copolymerised form and is produced by continuous bulk polymerisation in an ideally mixed tank reactor under stationary conditions and with incomplete conversions of from 25 to 60 mole %, with volume time yields of from 200 to 2000 g/l and at temperatures of from 60 to 150° C. in the presence of from 0.01 to 0.5% by weight, based on monomers, of an initiator decomposing into radicals with a decomposition rate constant at 100° C. of greater than $5 \times 10^{-3}$ sec.$^{-1}$ and, in another continuous process step, is freed from the residual monomers to a content of less than 0.1% by weight, based on the terpolymer.

* * * * *